United States Patent
Lee et al.

(10) Patent No.: US 9,189,882 B2
(45) Date of Patent: Nov. 17, 2015

(54) METHOD AND APPARATUS FOR RAY TRACING IN A 3-DIMENSIONAL IMAGE SYSTEM

(75) Inventors: Shin-Jun Lee, Yongin-si (KR); Dae-Kyu Shin, Suwon-si (KR); Kwang-Cheol Choi, Gwacheon-si (KR); Yun-Sik Kang, Bucheon-si (KR); Sung-Bong Yang, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 733 days.

(21) Appl. No.: 13/160,354

(22) Filed: Jun. 14, 2011

(65) Prior Publication Data
US 2011/0304624 A1 Dec. 15, 2011

(51) Int. Cl.
*G06T 15/40* (2011.01)
*G06T 15/06* (2011.01)

(52) U.S. Cl.
CPC ...................................... *G06T 15/06* (2013.01)

(58) Field of Classification Search
CPC ...................................................... G06T 15/06
USPC ................................................. 345/426, 419
See application file for complete search history.

(56) References Cited

U.S. PATENT DOCUMENTS

| | | | | |
|---|---|---|---|---|
| 5,025,400 A * | 6/1991 | Cook et al. | ..................... | 345/611 |
| 5,604,856 A * | 2/1997 | Guenter | ........................ | 345/473 |
| 5,847,711 A * | 12/1998 | Kaufman et al. | ............. | 345/424 |
| 6,028,608 A * | 2/2000 | Jenkins | ......................... | 345/619 |
| 6,057,847 A * | 5/2000 | Jenkins | ......................... | 345/422 |
| 6,300,956 B1 * | 10/2001 | Apodaca et al. | .............. | 345/619 |
| 6,580,810 B1 | 6/2003 | Yang et al. | | |
| 6,943,805 B2 * | 9/2005 | Snyder et al. | ................. | 345/589 |
| 7,046,244 B2 * | 5/2006 | Abramov et al. | ............. | 345/426 |
| 7,499,053 B2 * | 3/2009 | Keller et al. | ................... | 345/426 |
| 8,040,350 B2 * | 10/2011 | Buyanovskiy | ................ | 345/426 |
| 8,259,131 B2 * | 9/2012 | Brown et al. | ................. | 345/611 |
| 9,064,346 B2 * | 6/2015 | Ha et al. | ............................... | 1/1 |
| 2002/0008697 A1 * | 1/2002 | Deering | ........................ | 345/418 |
| 2003/0038798 A1 | 2/2003 | Besl et al. | | |
| 2004/0001645 A1 * | 1/2004 | Snyder | ........................ | 382/276 |
| 2004/0217956 A1 | 11/2004 | Besl et al. | | |
| 2005/0264565 A1 * | 12/2005 | Keller | ........................... | 345/421 |
| 2005/0278406 A1 * | 12/2005 | Keller | ........................... | 708/444 |
| 2006/0176302 A1 * | 8/2006 | Hayes et al. | .................. | 345/426 |
| 2006/0274065 A1 * | 12/2006 | Buyanovskiy | ................ | 345/424 |
| 2007/0040833 A1 * | 2/2007 | Buyanovski | .................. | 345/426 |
| 2007/0046686 A1 * | 3/2007 | Keller | ........................... | 345/581 |
| 2007/0075994 A1 * | 4/2007 | Fossum et al. | ................. | 345/419 |
| 2007/0109320 A1 * | 5/2007 | Skibak et al. | .................. | 345/611 |
| 2008/0024489 A1 * | 1/2008 | Shearer | ......................... | 345/421 |
| 2008/0024493 A1 * | 1/2008 | Bordoloi et al. | .............. | 345/423 |

(Continued)

OTHER PUBLICATIONS

International Search Report dated Feb. 24, 2012 in connection with International Patent Application No. PCT/KR2011/004344.

(Continued)

*Primary Examiner* — Phi Hoang (57) ABSTRACT

A ray tracing method and apparatus in a 3-Dimensional (3D) image system. The method includes sampling for four vertexes of each pixel in a plurality of pixels, sampling for a pivot of the each pixel, and determining a color of the each pixel using the sampling result on the four vertexes and the pivot.

18 Claims, 5 Drawing Sheets

(56) References Cited

U.S. PATENT DOCUMENTS

| | | |
|---|---|---|
| 2008/0031402 A1* | 2/2008 | Xue et al. .......................... 378/4 |
| 2008/0088619 A1* | 4/2008 | Shearer et al. ................ 345/420 |
| 2009/0033653 A1* | 2/2009 | Brown et al. ................. 345/419 |
| 2009/0096789 A1* | 4/2009 | Peterson et al. ............. 345/426 |
| 2009/0167763 A1* | 7/2009 | Waechter et al. ............ 345/426 |
| 2009/0189896 A1 | 7/2009 | Jiao et al. |
| 2009/0232353 A1 | 9/2009 | Sundaresan et al. |
| 2009/0322781 A1* | 12/2009 | Letavin et al. ................ 345/611 |
| 2010/0188396 A1* | 7/2010 | Mejdrich et al. ............. 345/419 |

OTHER PUBLICATIONS

Written Opinion of the International Searching Authority dated Feb. 24, 2012 in connection with International Patent Application No. PCT/KR2011/004344.

* cited by examiner

METHOD AND APPARATUS FOR RAY TRACING IN A 3-DIMENSIONAL IMAGE SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jun. 14, 2010 and assigned Serial No. 10-2010-0055825, the contents of which are herein incorporated by reference.

TECHNICAL FIELD OF THE INVENTION

The present invention relates to a 3-Dimensional (3D) image system. More particularly, the present invention relates to a ray tracing method and apparatus for Anti-Aliasing (AA).

BACKGROUND OF THE INVENTION

A 3D image system performs a rendering process of making a 3D image by instilling a realistic sensation into a 2-Dimensional (2D) image by considering external information such as light sources, positions, colors and the like. One example of the rendering is a ray tracing technique.

A ray tracing technique is a technique that includes, after generating a ray corresponding to each pixel of a screen from the observer viewpoint, determining a color of the each pixel depending on a primitive crossing with these rays to make a 3D image. That is, the ray tracing technique performs one or more samplings of each pixel and determines a color of a corresponding pixel.

In the above ray tracing technique, when generating one ray for one pixel, if a boundary of a primitive ranges over within one pixel, an aliasing phenomenon takes place, thus causing a problem of making a image non-realistic. Accordingly, the conventional ray tracing technique provides an AA technique of generating a plurality of rays for one pixel and determining a color of the pixel depending on an area that a primitive occupies in the pixel, thereby decreasing the occurrence of the aliasing phenomenon.

Figure 1A:
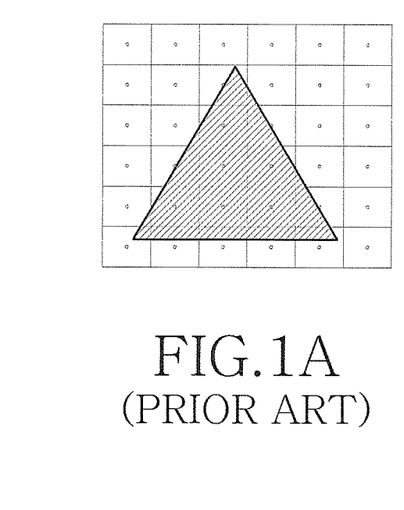
FIGS. 1A to 1C illustrate an aliasing phenomenon and an Anti-Aliasing (AA) technique in the conventional ray tracing technique.
Figure 1B:
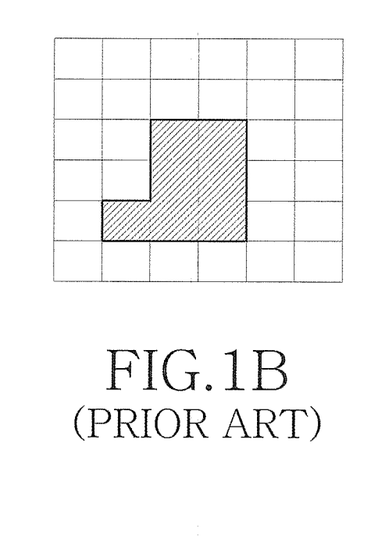
Figure 1C:
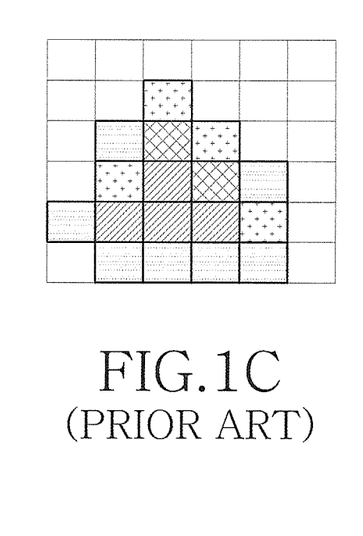

FIGS. 1A to 1C illustrate an aliasing phenomenon and an AA technique in the conventional ray tracing technique. In FIG. 1A, it is assumed that a triangular primitive exists in a virtual 3D space, and one ray is generated for the pivot (indicated by a dot) in each pixel. A color of a pixel whose one ray crosses within the triangle is determined as a color of the triangle, and a color of a pixel whose one ray does not cross within the triangle is determined as a background color. So, as illustrated in FIG. 1B, an image is made of a form that is difficult for a user to recognize as the triangle.

Accordingly, the conventional art provides a technique of making an image of a form that a user may recognize as a triangle as illustrated in FIG. 1C, by determining a color of each pixel considering an area that a primitive occupies in each pixel in FIG. 1A. In detail, the conventional art provides a scheme of generating a plurality of rays for each pixel, checking if a primitive crosses with a plurality of rays, and giving a weight to a color of the cross primitive, thereby determining a color of each pixel. For example, the conventional art provides a super sampling scheme of sampling at constant intervals within each pixel, a statistic sampling scheme of dividing each pixel into a plural number and generating a ray in an arbitrary position of each of the divided pixels, and the like.

But, the above scheme of generating a plurality of rays for one pixel has a problem of needing many operation amounts compared to a scheme of generating one ray for one pixel.

As described above, the ray tracing technique has an advantage of making an image more realistic as the number of simulating rays is large, while having a disadvantage of needing many operation amounts. In contrast, the ray tracing technique has an advantage of decreasing an operation amount as the number of simulating rays is reduced, while having a disadvantage of inducing aliasing and degrading a quality of an image.

So, there is a need to provide a technique of, when rendering a 3D image, restricting the number of rays for each pixel while minimizing the occurrence of the aliasing.

SUMMARY OF THE INVENTION

An aspect of the present invention is to substantially solve at least the above problems and/or disadvantages and to provide at least the advantages below. Accordingly, one aspect of the present invention is to provide a ray tracing method and apparatus in a 3-Dimensional (3D) image system.

Another aspect of the present invention is to provide a ray tracing method and apparatus for minimizing the occurrence of an aliasing phenomenon while simultaneously minimizing an operation amount in a 3D image system.

A further aspect of the present invention is to provide a method and apparatus for generating and tracing rays for four vertexes and a pivot of each pixel in a 3D image system.

The above aspects are achieved by providing a ray tracing method and apparatus in a 3D image system.

According to one aspect of the present invention, a ray tracing method in a 3D image system is provided. The method includes sampling for four vertexes of each pixel in a plurality of pixels, sampling for the pivot of the each pixel, and determining a color of the each pixel using the sampling result on the four vertexes and the pivot.

According to another aspect of the present invention, a ray tracing apparatus in a 3D image system is provided. The apparatus includes a sampling unit and a color determination unit. The sampling unit is configured to sample for four vertexes and a pivot of each pixel in a plurality of pixels. The color determination unit is configured to determine a color of the each pixel using the sampling result for the four vertexes and the pivot.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

FIGS. 1 to 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

Exemplary embodiments of the present invention provide a ray tracing method and apparatus in, a 3-Dimensional (3D) image system. Below, for the sake of convenience, a description is made for generating only a primary ray for each pixel, for example, but it will be understood that other embodiments may include generating an additional ray according to attribute information of a primitive that the primary ray crosses with, and detei mining a color of a corresponding pixel in consideration of the additional ray.

Figure 2:
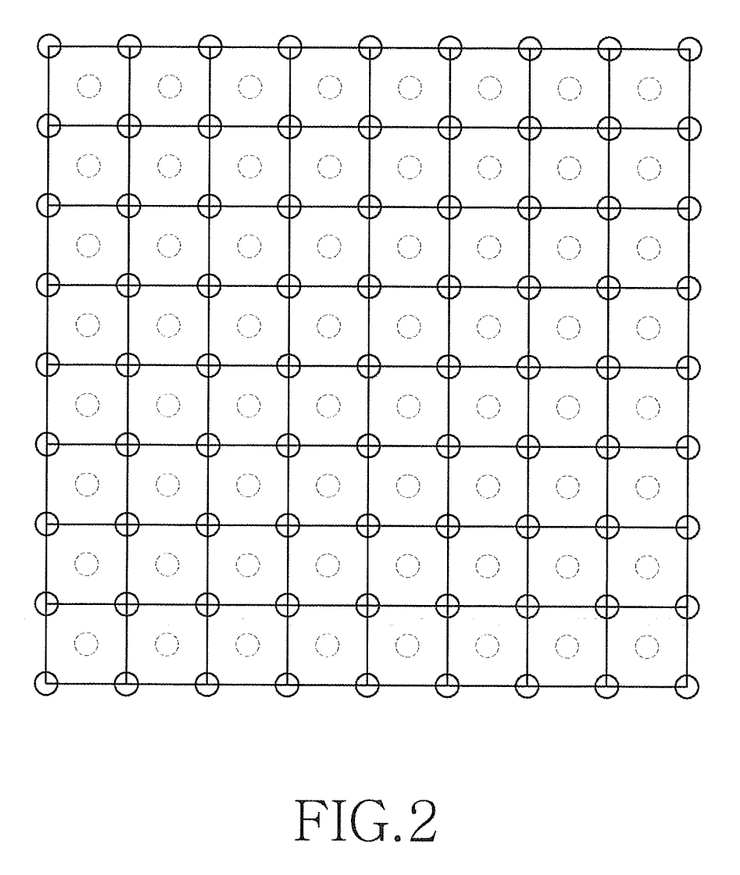
FIG. 2 illustrates a ray generation position in a 3-Dimensional (3D) image system according to an embodiment of the present invention.

FIG. 2 illustrates a ray generation position in a 3D image system according to an embodiment of the present invention.

As illustrated in FIG. 2, the 3D image system of the present invention performs sampling for four vertexes and the pivot of each pixel. That is, the 3D image system generates rays for the four vertexes and a ray for the pivot of each pixel and checks if each of the rays crosses with a primitive. Here, although the 3D image system performs the sampling for the four vertexes of each pixel, compared to the conventional ray tracing, techniques, the four vertexes use a reduced operation amount because the four vertexes overlap with vertexes of neighboring pixels. For instance, assuming that a screen has a resolution of 'x×y', when generating four rays in arbitrary positions of one pixel, the conventional statistic sampling technique should perform sampling of 'x×y×4' times, but the 3D image system of the present invention performs only sampling of '(x×y)+x+y+1' times. When considering a sampling for four vertexes of each pixel and additionally sampling for the pivot of each pixel, it may be appreciated that the number of times of sampling of the present invention is equal to '2(x×y)+x+y+1', and its operation amount is reduced compared to 'x×y×5', which is the number of times of sampling required when performing sampling at a rate of 5 times for each pixel according to the conventional technique.

Also, the 3D image system of the present invention performs a search based on an acceleration data structure only at the time of sampling for four vertexes of each pixel to determine a color of the each pixel and, for the pivot of the each pixel, does not perform the search based on the acceleration data structure. That is, for the pivot of the each pixel, the 3D image system performs a cross check with primitives obtained from the sampling result of the four vertexes. As above, compared to the conventional technique of performing a search based on an acceleration data structure for all sampling positions, the 3D image system performs, only for the four vertexes, the search based on the acceleration data structure, thereby being capable of reducing an operation amount.

As above, the 3D image system performs sampling for four vertexes and the pivot of each pixel and, according to Equation 1 below, gives a weight to a color of a primitive searched according to the sampling result and determines a color of a corresponding pixel. It will be understood that the scheme of determining the color of the each pixel may be modified within the scope of the present invention.

$$C = \sum_{i=0}^{n} (c_i \times w_i) \quad \text{[Eqn. 1]}$$

In Equation 1 above, the "C" represents a color of a corresponding pixel, the '$c_i$' represents a color of a primitive searched as the sampling result to cross with an ith ray among five rays of the corresponding pixel, and the '$w_i$' represents a weight for the color of the primitive crossing with the ith ray. Here, the sum of the '$w_i$' is equal to '1'.

A ray tracing technique of performing sampling for four vertexes and the pivot of each pixel as above is described in detail with reference to FIGS. 3 and 4 below.

Figure 3:
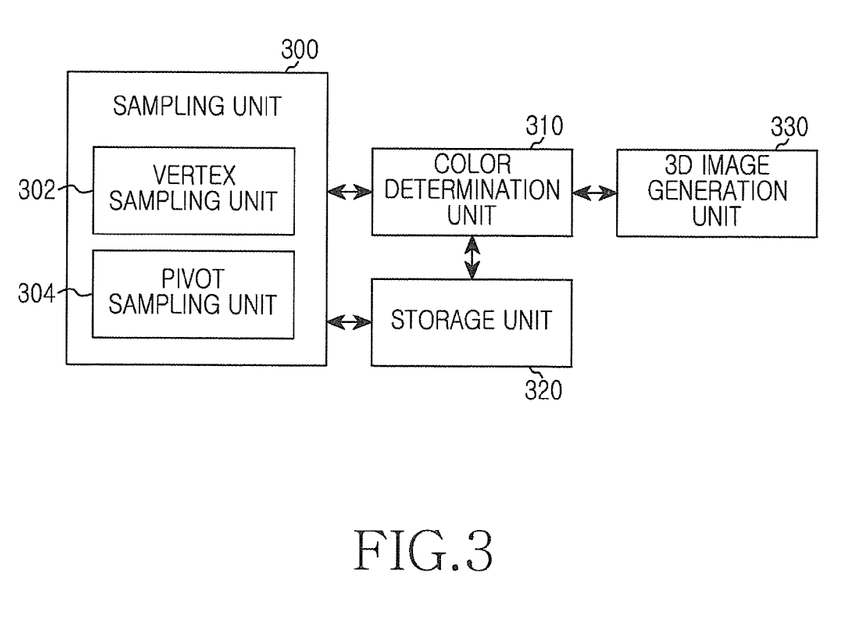
FIG. 3 illustrates a construction for tracing a ray in a 3D image system according to an embodiment of the present invention.

FIG. 3 illustrates an apparatus for tracing a ray in a 3D image system according to an embodiment of the present invention.

Referring to FIG. 3, the 3D image system includes a sampling unit 300, a color determination unit 310, a storne unit 320, and a 3D image generation unit 330.

The sampling unit 300 generates rays for four vertexes and the pivot of each pixel of a screen from the observer viewpoint, traces the rays for the four vertexes and the pivot, and checks if the rays cross with a primitive existing in a 3D virtual space. When the rays cross with the primitive, the sampling unit 300 acquires color information of the primitive corresponding to a cross position. After that, the sampling unit 300 provides the color determination unit 310 with cross information of the rays and the primitive and the color information of the primitive corresponding to the cross position. The sampling unit 300 may acquire the color information of the primitive corresponding to the cross position itself and provide the acquired color information to the color determination unit 310. Alternatively, the sampling unit 300 may acquire a reference value of the storage unit 320 that stores the color information of the primitive corresponding to the cross position and provide the acquired reference value to the color determination unit 310. Also, when the rays do not cross with the primitive, the sampling unit 300 provides information that indicates no crossing to the color determination unit 310.

Particularly, the sampling unit 300 includes a vertex sampling unit 302 and a pivot sampling unit 304. Through the vertex sampling unit 302 and the pivot sampling unit 304, the sampling unit 300 performs sampling for four vertexes of each pixel and sampling for the pivot of the each pixel. That is, after generating rays for four vertexes of each pixel from the observer viewpoint, the vertex sampling unit 302 traces the rays of the four vertexes through an acceleration data structure and checks if the rays cross with a primitive. Here, the acceleration data structure is a scheme of dividing a virtual 3D space into a plurality of sub spaces and, for a primitive included in a sub space where a ray crosses among the divided sub spaces, performing a cross check for the ray and the primitive. Its example is an acceleration data structure technique of a tree form. The present invention may use various acceleration data structure techniques well known to the conventional art. The vertex sampling unit 302 performs a cross check for the four vertexes with the primitive using the acceleration data structure technique. When the check result is that there is a primitive crossing with at least one of the rays of the four vertexes, the vertex sampling unit 302 acquires color information of the primitive corresponding to a cross position and provides the acquired color information to the color determination unit 310. Also, when the check result indicates that there is a primitive crossing with at least one of the rays of the four vertexes, the vertex sampling unit 302 provides information of the cross primitives to the pivot sampling unit 304.

Also, the pivot sampling unit 304 generates a ray for the pivot of each pixel from the observer viewpoint and then, checks if the generated ray of the pivot crosses with a primitive. The pivot sampling unit 304 may trace the ray of the pivot through an acceleration data structure to perform a cross check for the ray of the pivot and the primitive, but may check if the ray of the pivot crosses with cross primitives provided from the vertex sampling unit 302. This is because, when considering a size of a pixel based on a resolution of a screen, a size of one pixel is small, so it is not likely that a ray of the pivot of a predetermined pixel crosses with any primitive not crossing with rays of four vertexes of the predetermined pixel. That is, assuming that, if a ray of the pivot of a predetermined pixel crosses with a primitive, the cross primitive is a primitive crossing with at least one of the rays of the four vertexes of the predeteimined pixel. Then, the present invention checks if the ray of the pivot crosses with the primitives crossing with at least one of the rays of the four vertexes. By not performing an acceleration data structure for a ray of the pivot of each pixel as above, the present invention may obtain an effect of being capable of reducing an operation amount compared to the conventional techniques of performing sampling of the same number of times for each pixel. Here, the pivot sampling unit 304 may check if the ray of the pivot crosses with the cross primitives using a linear equation for the ray of the pivot and a planar equation for the primitives crossing with at least one of the rays of the four vertexes. Also, when there is a primitive crossing with the ray of the pivot, the pivot sampling unit 304 acquires color information of the primitive corresponding to a cross position and provides the acquired color information to the color determination unit 310.

Figure 5:
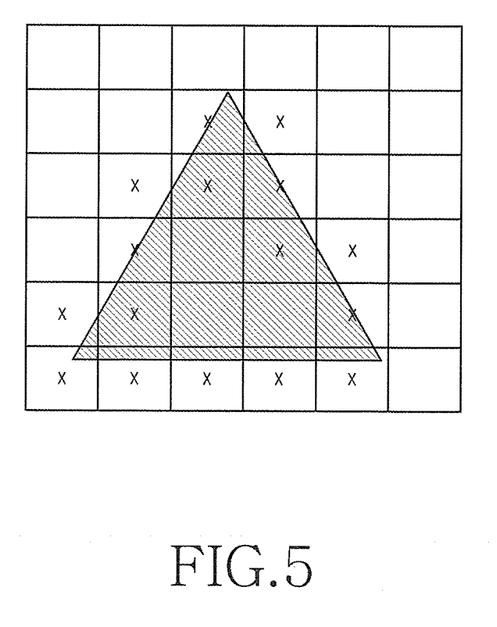
FIG. 5 illustrates pixels without a cross check for their pivots in a 3D image system according to an embodiment of the present invention.

Also, when there is not a primitive crossing with at least one of the rays of the four vertexes, the pivot sampling unit 304 may omit a cross check for the ray of the pivot and determine that there is not a primitive crossing with the ray of the pivot. In contrast, when all the rays of the four vertexes cross with one primitive, the pivot sampling unit 304 may omit a cross check for the ray of the pivot and determine that the one primitive crosses with the ray of the pivot. For example, when there is not a primitive crossing with at least one of rays of four vertexes of a pixel or all the rays of the four vertexes cross with one primitive as illustrated in FIG. 5, the pivot sampling unit 340 may omit a cross check for the pivot of a corresponding pixel, and perform a cross check only for the pivots of other pixels. In FIG. 5, 'X' denotes a pixel performing a cross check for its pivot.

The color determination unit 310 receives the sampling result on four vertexes and the pivot of each pixel from the sampling unit 300, and determines a color of each pixel using the sampling result. In detail, the color determination unit 310 determines if rays of the four vertexes and the pivot of the each pixel each cross with a primitive and, when it is determined to cross, if color information of the primitive corresponding to a cross position is provided, according to Equation above, the color determination unit 310 gives a weight to the color information of the primitive corresponding to the cross position and determines a color of each pixel.

For instance, assuming that 'R1', 'R2', 'R3', 'R4', and 'R5' each denote rays of one of the four vertexes and the pivot of a predetermined pixel, and that 'R1' crosses with a primitive 'P1', 'R2' and 'R3' cross with no primitive, and 'R4' and 'R5' cross with a primitive 'P2', the color determination unit 310 may multiply $C_{P1}$ (a color of primitive 'P1') by a weight '⅕' since 'P1' crosses with one ray, multiply $C_{P2}$ (a color of primitive 'P2') by a weight '⅖' since 'P2' crosses with two rays, and then add these products and determine the addition result as a color value of the predetermined pixel.

Also, when there is no primitive crossing with rays of four vertexes of a predetermined pixel, the color determination unit 310 determines a color of the predetermined pixel as a preset background color.

The storage unit 320 stores various programs and data for a general operation of the 3D image system, and stores information (e.g., primitive form, position, color information and the like) on primitives modeled in a 3D virtual space.

The 3D image generation unit 330 receives color information of each pixel from the color determination unit 310 and, according to the color information, colors each pixel of a screen to make a 3D image.

Figure 4:
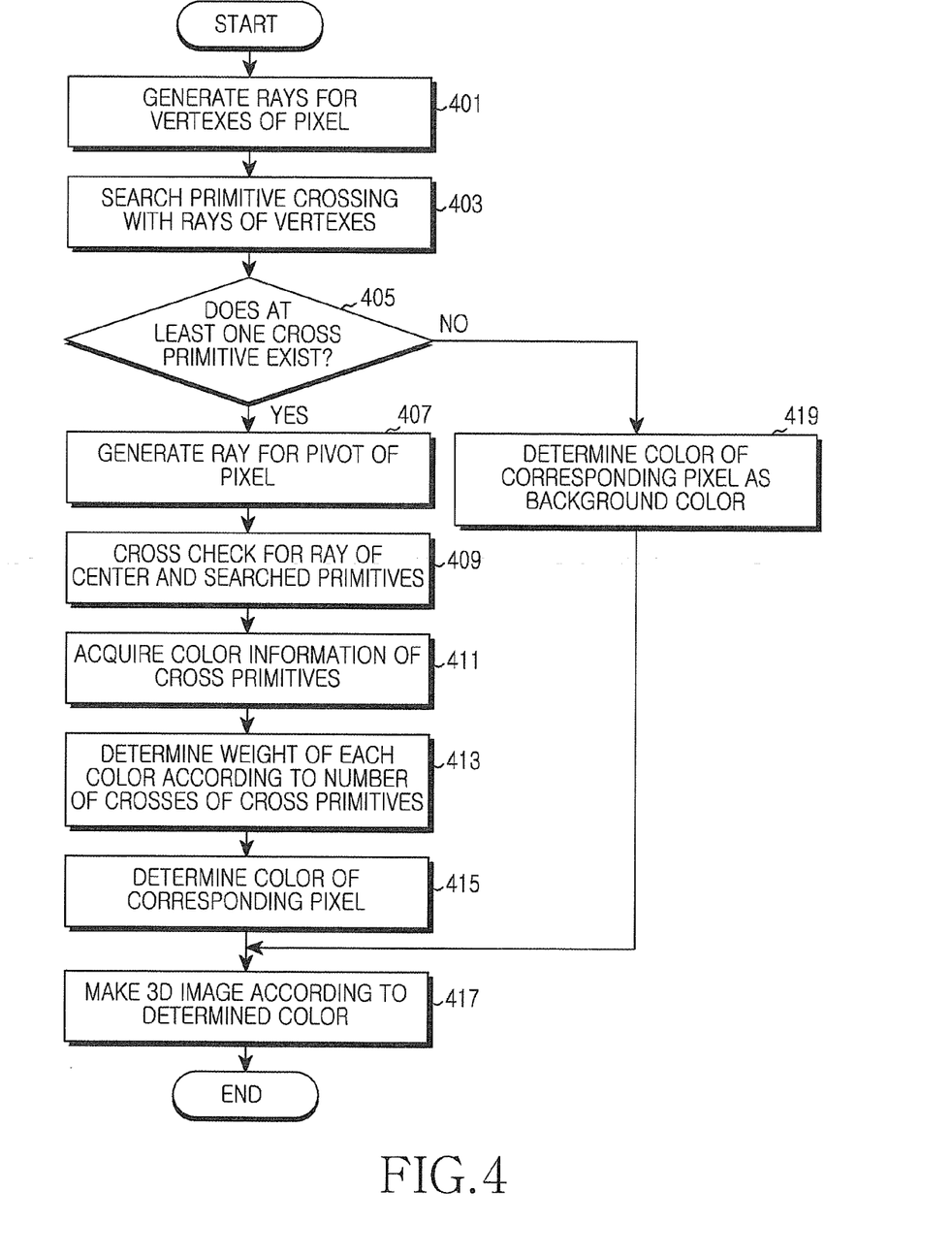
FIG. 4 illustrates a procedure of tracing a ray in a 3D image system according to an embodiment of the present invention.

FIG. 4 is a flowchart illustrating a procedure of tracing a ray in a 3D image system according to an embodiment of the present invention.

Referring to FIG. 4, in step 401, the system generates rays for four vertexes by each pixel of a screen from the observer viewpoint and then, proceeds to step 403 and searches a primitive crossing with the rays of the four vertexes. Here, the system traces the rays of the four vertexes through an acceleration data structure and checks if the rays cross with the primitive existing in a virtual 3D space. Here, the acceleration data structure is a scheme of dividing the virtual 3D space into a plurality of sub spaces and, for a primitive included in a sub space where a ray crosses among the divided sub spaces, performing a cross check for the ray and the primitive. The present invention may use various acceleration data structure techniques well known to the conventional art.

After that, in step 405, the system checks if there is at least one primitive crossing with at least one of the rays of the four vertexes. When there is not a primitive crossing with at least one of the rays of the four vertexes, i.e., when there is not a cross primitive for each of the rays of the four vertexes as a result of a cross check for each of the rays of the four vertexes, the system proceeds to step 419 and determines a color of a corresponding pixel as a background color and then, proceeds to step 417 below.

In contrast, when there is the primitive crossing with at least one of the rays of the four vertexes, the system proceeds to step 407 and generates a ray for the pivot of the pixel. After that, in step 409, the system performs a cross check between the generated ray of the pivot and the primitive crossing with at least one of the rays of the four vertexes of the pixel. Here, the system will be able to check if the ray of the pivot crosses with the cross primitive using a linear equation for the ray of the pivot and a planar equation for the cross primitive. Undoubtedly, the system may perform a cross check for the ray of the pivot through an acceleration data structure. Also, when all rays of four vertexes of a predetermined pixel cross with one primitive, the system may omit a cross check for a ray of the pivot of the predetermined pixel and determine that the ray of the pivot crosses with the one primitive.

After that, in step 411, the system acquires color information of primitives crossing with at least one of the rays of the four vertexes and the ray of the pivot, for each of corresponding pixels. The system itself may acquire color information of a primitive corresponding to a position where each ray crosses with the primitive, or may acquire a reference value of a storage unit 320 that stores the color information of the primitive corresponding to the cross position.

Next, in step 413, the system determines weights for the acquired color information according to the number of crosses of the cross-checked primitives by each pixel. And then, the system proceeds to step 415 and determines a color of a corresponding pixel according to the weight. In detail, the system determines a weight for a color of a corresponding primitive according to how many rays have crossed with each of the cross-checked primitives and then, determines a color of a corresponding pixel as in Equation 1 above. For example, assuming that 'R1', 'R2', 'R3', 'R4', and 'R5' each denote rays of one of the four vertexes and the pivot of a predetermined pixel, and that 'R1' crosses with a primitive 'P1', 'R2' and 'R3' cross with no primitive, and 'R4' and 'R5' cross with a primitive 'P2', the color determination unit 310 may multiply $C_{P1}$ (a color of primitive 'P1') by a weight '1/5' since 'P1' crosses with one ray, multiply $C_{P2}$ (a color of primitive 'P2') by a weight '2/5' since 'P2' crosses with two rays, and then add these products and determine the addition result as a color value of the predetermined pixel.

Next, the system proceeds to step 417 and colors each pixel of the screen according to the color information of the each pixel and makes a 3D image. And then, the system terminates the algorithm according to the present invention.

Exemplary embodiments of the present invention have an effect of, by generating and tracing rays for four vertexes and a ray for the pivot by each pixel, minimizing the occurrence of an aliasing phenomenon while simultaneously minimizing an operation amount.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A ray tracing method in a 3-Dimensional (3D) image system, the method comprising:
    generating four vertex rays for four vertices and one pivot ray for a pivot of each basic unit pixel, wherein a total number of basic unit pixels determines a resolution of the 3D image system;
    sampling four vertices of each basic unit pixel to check if each of the four vertex rays of each basic unit pixel crosses with a primitive;
    sampling the pivot of the each basic unit pixel to check if each of the pivot ray crosses with the primitive; and
    determining a color of each basic unit pixel using a result of the sampling for the four vertexes and the pivot of each basic unit pixel,
    wherein sampling the four vertices of each basic unit pixel comprises, when no primitive crossing with at least one of the four vertex rays exists, omitting a cross-check for the pivot ray and determining that no primitive crossing with the pivot ray exists.

2. The method of claim 1, wherein sampling for the four vertices comprises tracing each of the four vertex rays through an acceleration data structure and checking if each of the four vertex rays crosses with the primitive existing in a 3D virtual space.

3. The method of claim 2, further comprising, when at least one of the four vertex rays crosses with the primitive, acquiring color information of the primitive corresponding to a cross position.

4. The method of claim 3, wherein the color information comprises at least one of a color value of the primitive corresponding to the cross position or a reference value of a memory configured to store the color value.

5. The method of claim 2, wherein sampling the pivot of each basic unit pixel comprises checking if the pivot ray crosses with the primitive crossing with at least one of the four vertex rays of the basic unit pixel.

6. The method of claim 5, further comprising, when the pivot ray crosses with the primitive crossing with the at least one of the four vertex rays, acquiring color information of the primitive corresponding to a cross position.

7. The method of claim 6, wherein the color information comprises at least one of a color value of the primitive corresponding to the cross position or a reference value of a memory configured to store the color value.

8. The method of claim 1, wherein sampling the four vertices of each basic unit pixel comprises, when all of the four vertex rays of the basic unit pixel cross with the primitive, omitting a cross check for the pivot and determining that the pivot ray crosses with the primitive crossing with all of the four vertex rays.

9. The method of claim 1, wherein determining the color of the each basic unit pixel comprises:
    according to a number of crosses of primitives cross-checked through the sampling, determining a weight for color information of each of the cross-checked primitives; and
    determining a color of each basic unit pixel using the weight.

10. An apparatus for tracing a ray in a 3-Dimensional (3D) image system, the apparatus comprising:
    a sampling circuitry configured to:
        generate four vertex rays for four vertices and one pivot ray for a pivot of each basic unit pixel;
        sample four vertices of each basic unit pixel to check if each of the four vertex rays of each basic unit pixel crosses with a primitive; and
        sample the pivot of each basic unit pixel to check if each of the pivot ray crosses with the primitive, wherein a resolution of the 3D image system is determined by a total number of basic unit pixels; and
    a color determination circuitry configured to:
        determine a color of each basic unit pixel using the sampling result for the four vertices and the pivot of each basic unit pixel,
        wherein, when no primitive crossing with at least one of the four vertex rays of each basic unit pixel exists, the sampling circuitry is further configured to omit a cross-check for the pivot ray and determine that no primitive crossing with the pivot ray exists.

11. The apparatus of claim 10, wherein the sampling circuitry is configured to trace each of the four vertex rays through an acceleration data structure and check if each of the four vertex rays crosses with the primitive existing in a 3D virtual space.

12. The apparatus of claim 11, wherein the sampling circuitry is further configured to acquire color information of the primitive corresponding to a cross position when at least one of the four vertex rays crosses with the primitive.

13. The apparatus of claim 12, wherein the sampling circuitry is further configured to acquire the color information comprising at least one of a color value of the primitive corresponding to the cross position or a reference value of a memory configured to store the color value.

14. The apparatus of claim 11, wherein the sampling circuitry is configured to check if the pivot ray crosses with the primitive crossing with at least one of the four vertex rays of the basic unit pixel.

15. The apparatus of claim 14, wherein the sampling circuitry is configured to acquire color information of the primitive corresponding to a cross position when the pivot ray crosses with the primitive.

16. The apparatus of claim 15, wherein the sampling circuitry is configured to acquire the color information comprising at least one of a color value of the primitive corresponding to the cross position or a reference value of a memory configured to store the color value.

17. The apparatus of claim 10, wherein, the sampling circuitry is configured to omit a cross check for the pivot and determine that the pivot ray crosses with the primitive crossing with all of the four vertex rays of the basic unit pixel when all of the four vertex rays of the basic unit pixel cross with the primitive.

18. The apparatus of claim 10, wherein the color determination circuitry is configured to determine, according to a number of crossings with the primitive cross-checked through the sampling, a weight for color information of each of the cross-checked primitives, and determine a color of each basic unit pixel using the weight.

* * * * *